US007426231B1

(12) United States Patent
Dorfman

(10) Patent No.: US 7,426,231 B1

(45) **Date of Patent: *Sep. 16, 2008**

(54) COMMUNICATION WITHIN BUILDINGS

(76) Inventor: Bertrand Dorfman, 444 E. 82nd St., New York, NY (US) 10028

(*) Notice: Subject to any disclaimer, the term of this patent is extended or adjusted under 35 U.S.C. 154(b) by 650 days.

This patent is subject to a terminal disclaimer.

(21) Appl. No.: 10/223,817

(22) Filed: Aug. 19, 2002

Related U.S. Application Data

(63) Continuation-in-part of application No. 09/596,516, filed on Jun. 19, 2000, now Pat. No. 6,463,090.

(51) Int. Cl.
*H04B 1/00* (2006.01)

(52) U.S. Cl. .................................................... 375/130

(58) Field of Classification Search ................. 375/130, 375/131, 132, 140, 219, 222, 220, 135, 136, 375/141, 146, 147, 295, 309, 315, 377; 324/343; 343/700 R, 737, 751, 729, 749; 342/350, 342/368

See application file for complete search history.

(56) References Cited

U.S. PATENT DOCUMENTS 4,792,946 A * 12/1988 Mayo ......................... 370/245
5,231,646 A * 7/1993 Heath et al. ................. 375/130
5,903,826 A * 5/1999 Nowak .................... 455/277.1
5,946,622 A * 8/1999 Bojeryd ...................... 455/444
6,005,884 A * 12/1999 Cook et al. ................. 375/132
6,405,018 B1 * 6/2002 Reudink et al. ............... 455/20
6,463,090 B1 * 10/2002 Dorfman .................... 375/131
6,522,643 B1 * 2/2003 Jacomb-Hood et al. ..... 370/347
6,583,767 B1 * 6/2003 Fitz ............................ 343/676
6,980,768 B2 * 12/2005 Arend et al. ............... 455/3.01
2004/0042421 A1 * 3/2004 Mahany ...................... 370/320

* cited by examiner

*Primary Examiner*—Mohammad Ghayour
*Assistant Examiner*—Vineeta S Panwalkar
(74) *Attorney, Agent, or Firm*—Cowan, Liebowtiz & Latman, P.C.

(57) ABSTRACT

A system for communicating between stations which are at a number of different locations in a large building in which radio transmission is achieved through corridors or stairwell shafts or through windows along a zone outside of the building or any combination thereof. This system employs communication through spread spectrum transceivers and a set of directional antennas. At each station, one of the antennas is circular polarized and the other is linear polarized with a horizontal electrical component to facilitate reflection off the floors of the building. The spread spectrum is a hybrid frequency hopped and direct sequence modulated signal.

14 Claims, 9 Drawing Sheets

COMMUNICATION WITHIN BUILDINGS

REFERENCE TO RELATED APPLICATIONS

This application is a continuation-in-part of application Ser. No. 09/596,516 filed Jun. 19, 2000 now U.S. Pat. No. 6,463,090 and entitled: Communication In High Rise Buildings.

BACKGROUND OF THE INVENTION

This invention relates to a communication system within a building and more particularly to communication along convoluted and non-linear paths in a building.

A typical situation to which this invention is addressed is one where a number of people who occupy space in a large building operate computers and have a requirement to interact with each other and have access to each others' files and an Internet service provider on a real time basis. In order to satisfy this requirement, these computers must be interconnected in some manner and also connected with an Internet service provider. To accomplish this, a network is created which interconnects the computers through a central unit called a server, which acts as a library for files as well as a traffic controller. The computers and server are connected to each other by means of a series of copper wire or fiberoptic cables. As a result, all equipment is fixed in position, not able to be moved and encumbered by masses of cables which may require the construction of special raceways beneath raised floors. These installations are costly, time consuming to install, and difficult to modify. If computers must be moved to new locations in the building, the installation network of cables, raised floors and any other special construction must be abandoned and a new installation created.

In addition, for any of the computers which are part of the network to be connected to an Internet service provider, a router must be connected to the server and this router must also be connected to a special copper wire or fiberoptic telephone company cable. This equipment and cabling is also fixed in position and would be abandoned if the system location were to be changed. In addition, substantial fees must be paid on an ongoing basis to a telephone company in order to connect the computers through the server to an Internet service provider which are exclusive of any fees paid to the Internet service provider for their service.

An alternate to the creation of cabling networks is wireless communication. However, to date this technique has yielded limited results in that effective communication can only be accomplished for short distances and is subject to interference from spurious signals (noise), loss of transmitted signal strength (attenuation), and areas where no signal can be received (null points). Null points result from reflected signals canceling primary signals under certain conditions. All of these types of interference are present in severe form in large buildings as a result of phenomena unique to this environment.

Also, in order to create a wireless link to an Internet service provider, a cable must be installed the entire length of the building which leads to an antenna located on the roof of the building. Each computer or server must then be cable connected to this riser cable in order to communicate outside the building with the wireless Internet service provider.

A major purpose of this invention is to provide an inexpensive and reliable communication link between any number of computers located within a large building in a fashion that provides an ability to readily relocate, modify and reconfigure the network within the building.

A further purpose of this invention is to provide inexpensive and reliable communication between any number of electronic stations within a large building.

It is a further purpose of this invention to provide the above objects in a system that would also optionally permit a reliable and simplified access to an Internet service provider.

BRIEF DESCRIPTION

In brief, this invention enables effective communication between stations in large buildings having non-linear and convoluted transmission paths. The objectives recited above are met by use of two-way wireless spread spectrum transmission and reception involving directional polarized antennas coupled to specific transmission paths. Those paths may be (a) the stairwell shafts of the building, or (b) a zone outside of the building adjacent to the skin of the building which is accessed through the windows of the building or (c) paths through corridors along a floor of a large building, or any combination of these paths.

The construction of large buildings makes wireless communication within the buildings unreliable because electromagnetic energy is absorbed and reflected in unpredictable and uncontrollable ways.

It has been found that electromagnetic energy will migrate through a building effectively if it can be coupled to paths which are available in most buildings. One of these paths is the stairwells and corridors. Another path is a zone adjacent to the skin of the building which is accessed through windows. Sending signals through these paths provides markedly better results than does other methods.

To couple energy to these paths, two types of directional antennas are employed. Both types of antennas are patch type having an included angle of less than 60°. These antennas are deployed to generate a radiation pattern which aims them at the locations where access can be had to the corridors, stairwells and/or windows.

A first patch type antenna is linear polarized with a horizontal electrical field. This provides enhanced signal strength over substantial distances in part as a result of ground reflections.

A second patch type antenna employs circular polarization. The circular polarization enables the receiver to ignore reflected signals and receive only the primary signal. The circular polarization minimizes the existence of null points.

Both types of antennas direct the electromagnetic energy across a floor to access and transmit through corridors, stairwells and out of windows along a vertical zone adjacent to the skin of the building and back in other windows. Reception using similar antenna arrangements receive these signals.

The transmission and reception employs a transceiver using a spread spectrum technique that involves a hybrid frequency hopped/direct sequence modulated signal of a known type such as is disclosed in the text "Spread Spectrum Systems With Commercial Applications", Robert C. Dixon, 3$^{rd}$ edition, copyright in 1994 by John Wiley & Sons, Inc. publisher at 605 3$^{rd}$ Avenue, New York, N.Y. 10158

The linear polarized antenna and the circular polarized antenna are connected to a switching circuit at the transmitter and the receiver so that the signals generated are transmitted and received as packets of data alternating between the two antennas. The switch is at a predetermined rate that is greater than the hopping rate of the spread spectrum signal.

There are three major types of situations in which this invention will be usefully employed.

An example of the first type of situation is where a plurality of computers at different places within the building are linked together through the transmission provided by the system. In this kind of situation, computers are not necessarily in fixed locations; although there are cases where fixed locations are either required or preferred.

A second type of situation is one where by reasons of fire code and/or building construction, the stations of communication used in the system are in fixed locations, some of which may be in a nook or cranny creating a dead spot where the usual type of communication would not work.

One fire safety situation is where a door may have to become locked or unlocked in response to a particular signal. The location of that door is normally predetermined and the system is well adapted to be able to communicate with the control mechanism for the door regardless of its location.

A third situation is a mobile situation. For example, there may be communication between fire fighters or rescue workers in a building where a fire causes damage to the communication links.

DESCRIPTION OF THE PREFERRED EMBODIMENTS

Figure 1:
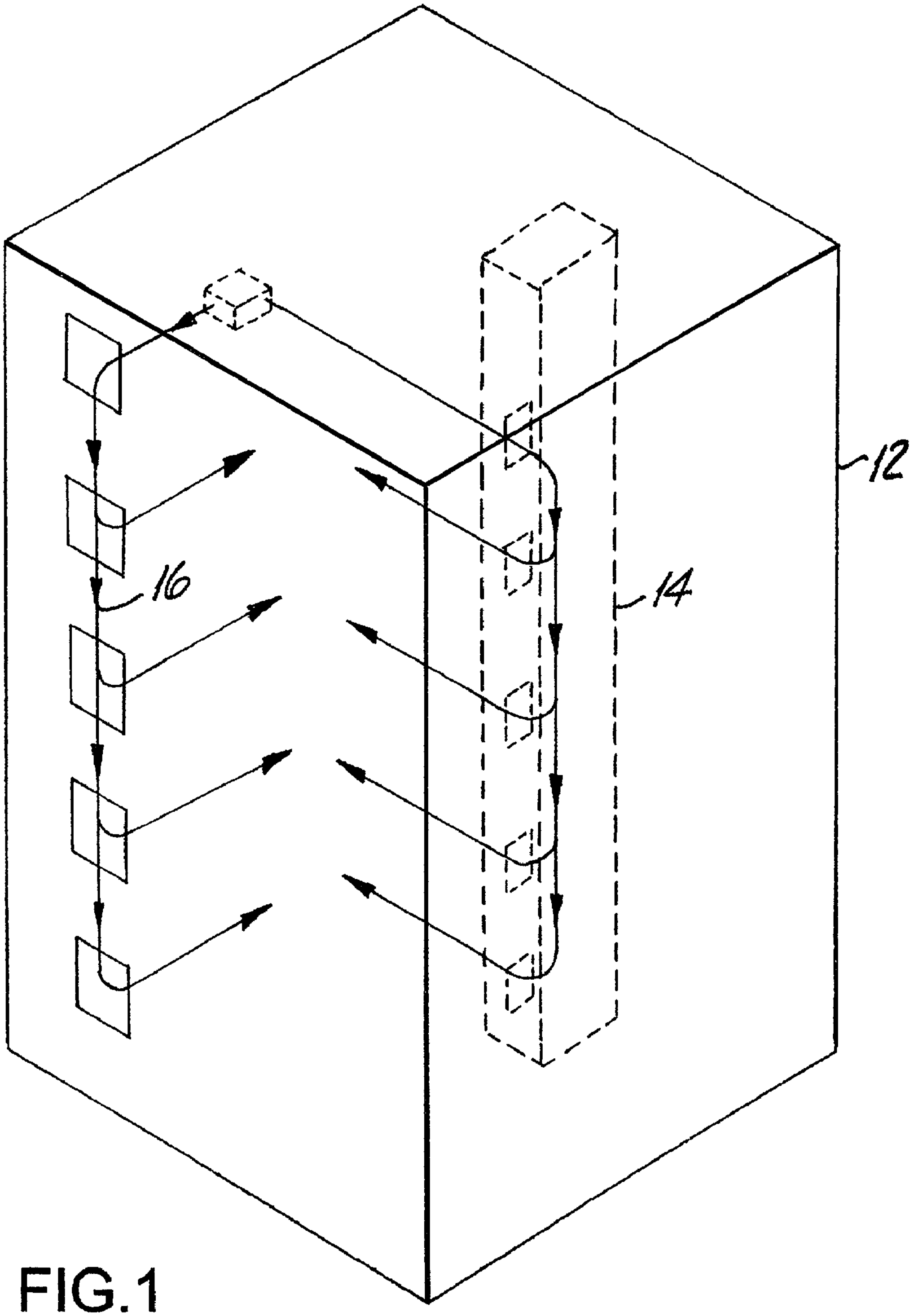
FIG. 1 schematically illustrates a large multi-story building showing the coupling of a signal from a station through a stairwell and along the zone adjacent to the outside skin of the building.
Figure 2:
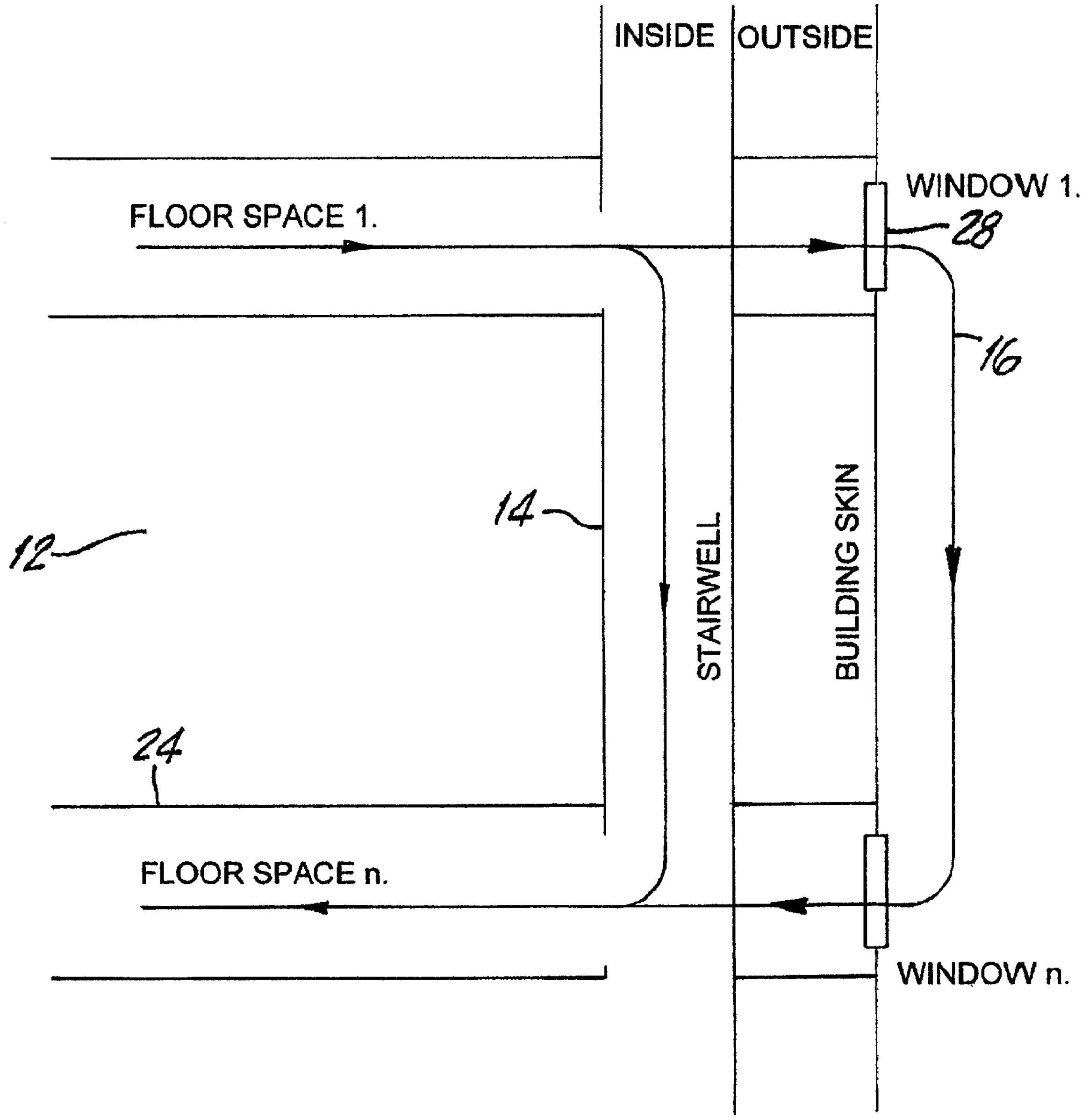
FIG. 2 is a highly schematic illustration of transmission paths on particular floors of the FIG. 1 building.
Figure 3:
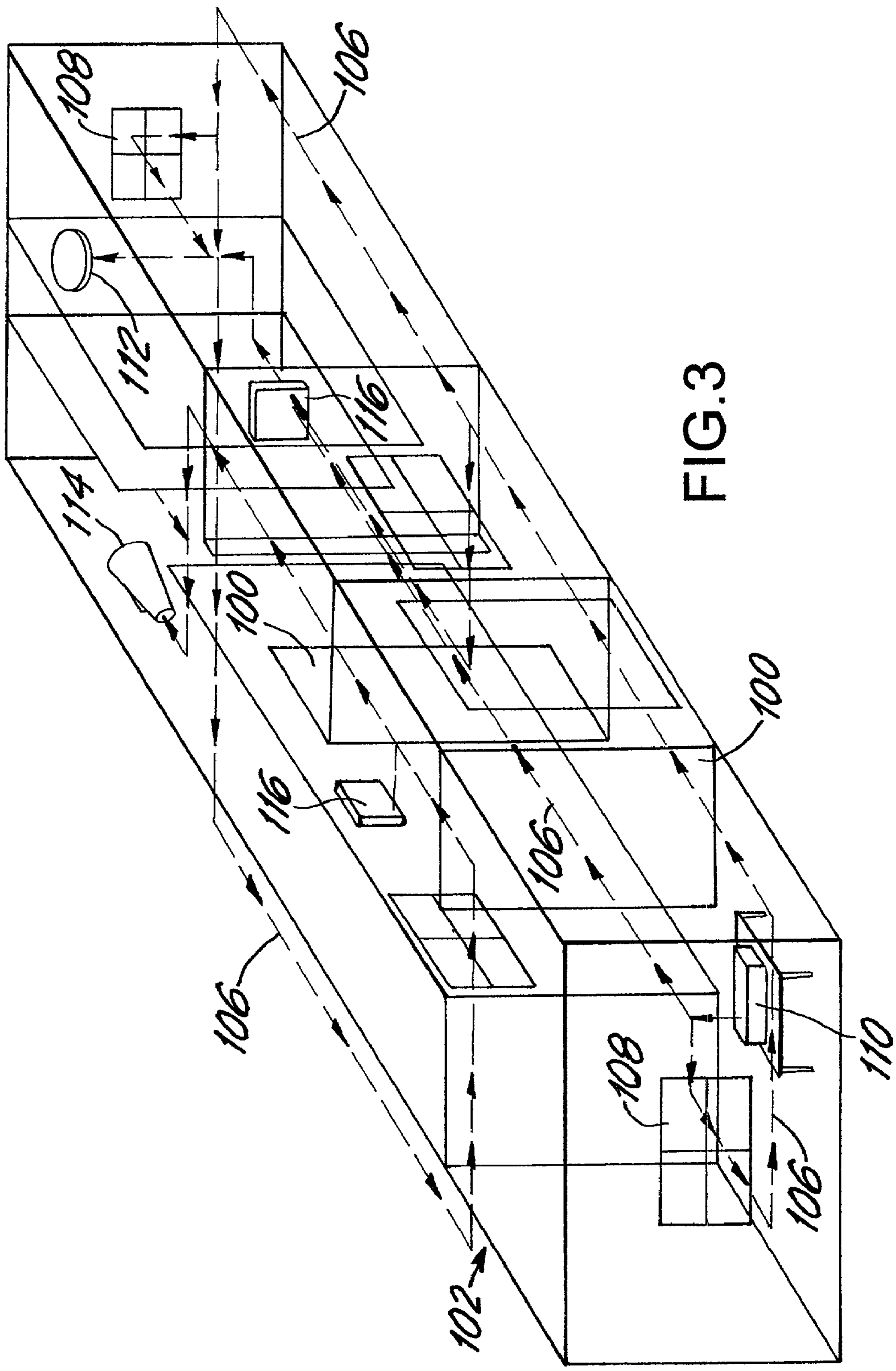
FIG. 3 schematically illustrates a large convoluted floor space in a building showing the coupling of a signal from a station through the passageways in the floor space.
Figure 4:
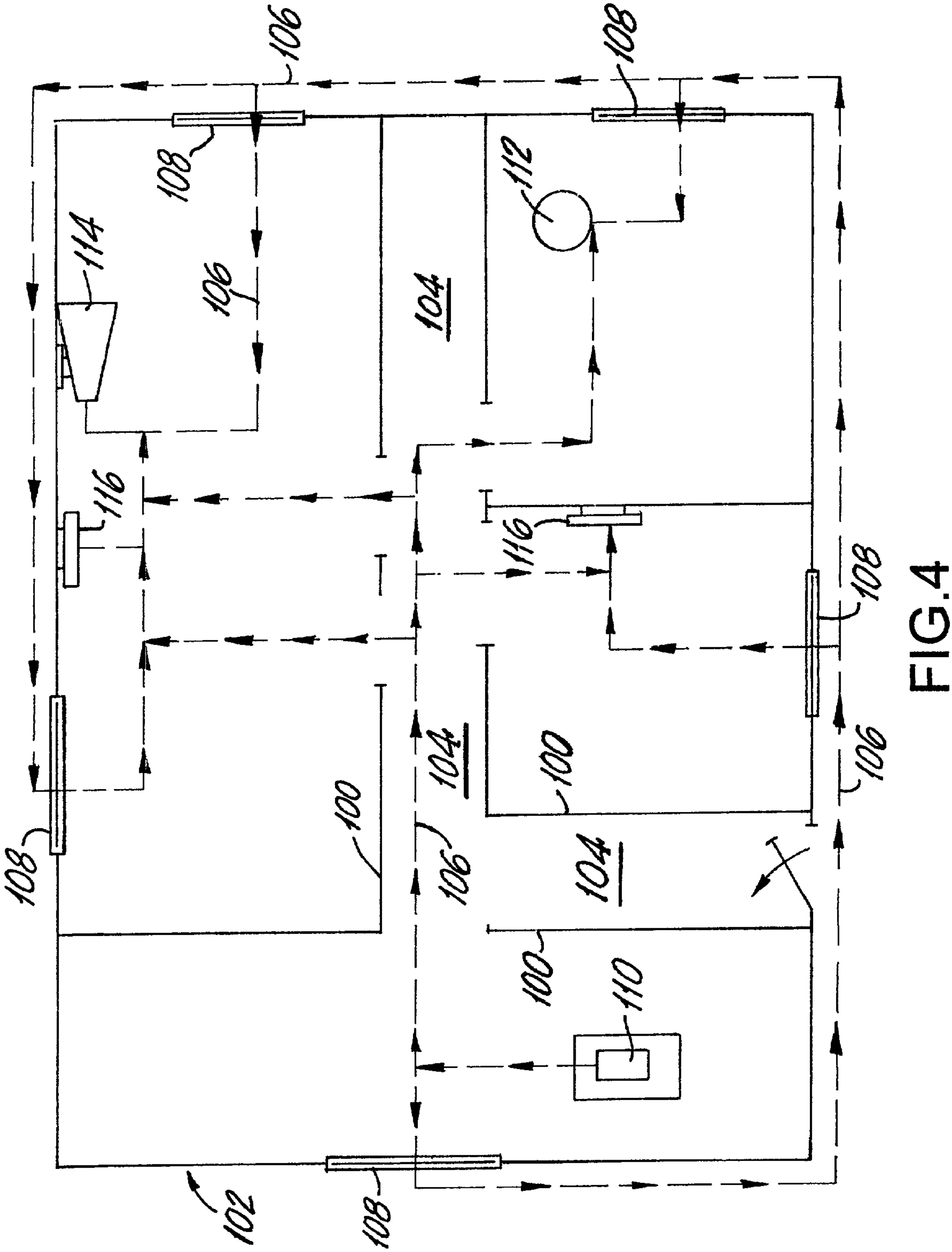
FIG. 4 is a highly schematic illustration of transmission paths on the FIG. 3 floor including transmission along the outside wall of the building.

FIGS. 1 and 2 illustrate an embodiment of this invention applied to a large multi-story building. FIGS. 3 and 4 illustrate an embodiment of this invention applied to a single large floor of a building with convoluted passageways within that floor.

FIGS. 5 through 9 illustrate, in essentially block form, the equipment relationships involved in implementing the systems illustrated in FIGS. 1 through 4.

FIGS. 1 and 2 and 5 through 9 are the same as FIGS. 1 and 2 and 3 through 7 of the referenced patent application Ser. No. 09/596,516.

The FIG. 1 system is an arrangement in a large multi-story building 12 to provide signal transmission along selected paths. Specifically, stairwell shafts 14 and zones 16 located outside the building adjacent to the skin of the building are employed as transmission paths. These paths have been found to enable successful communication between virtually any two locations within the building.

As shown in FIG. 2, each floor 24 in a multi-story large building 12 has access ways to stairwells 14 and windows 28 thereby enabling the coupling of electromagnetic energy (signals) to the stairwell shafts and to the area outside the building that is adjacent to the skin of the building. These stairwells and window access ways also enable electromagnetic energy signals to enter any floor after having been transmitted through the stairwell shafts 14 and the zones 16 outside the building adjacent to the skin of the building.

The FIG. 3 and FIG. 4 embodiment illustrates the embodiment of the invention in which application is made to a large complicated floor space in a building in which various walls and barriers 100 effectively block the transmission of relatively low level electromagnetic energy and make possible, or at least impractical, point-to-point communication between many points in the floor involved.

FIG. 3 is a highly schematic illustration in which the walls 100 of the floor are shown as if they were transparent so that paths 106 through which energy passes will be more readily visualized.

FIG. 4 is a plan schematic that illustrates these paths 106 a bit more clearly.

More specifically, the FIGS. 3 and 4 embodiment might be used with a fire alarm system in which communications are needed between the fire command station 110, a smoke detector 112, a public address and fire alarm speaker 114 and various fire alarm manual pull stations 116. Each of the stations 112, 114, 116 requires a transceiver in order to provide appropriate communication between the station and the fire command station 110. There might be certain individual stations which are passive in that they receive a command from the center station 110 and respond thereto without requiring transmission back. Such stations would not require a transceiver. However, many such stations do and will require a transceiver.

By virtue of this invention, effective communication using spread spectrum technology on directional antennas is made along at least the paths 106 indicated by arrows.

To the extent there are windows 108 on the floor involved, there will be a certain amount of transmission out a window along the exterior skin of the building and into another window. Such transmission will also be employed to facilitate this communication.

Figure 5:
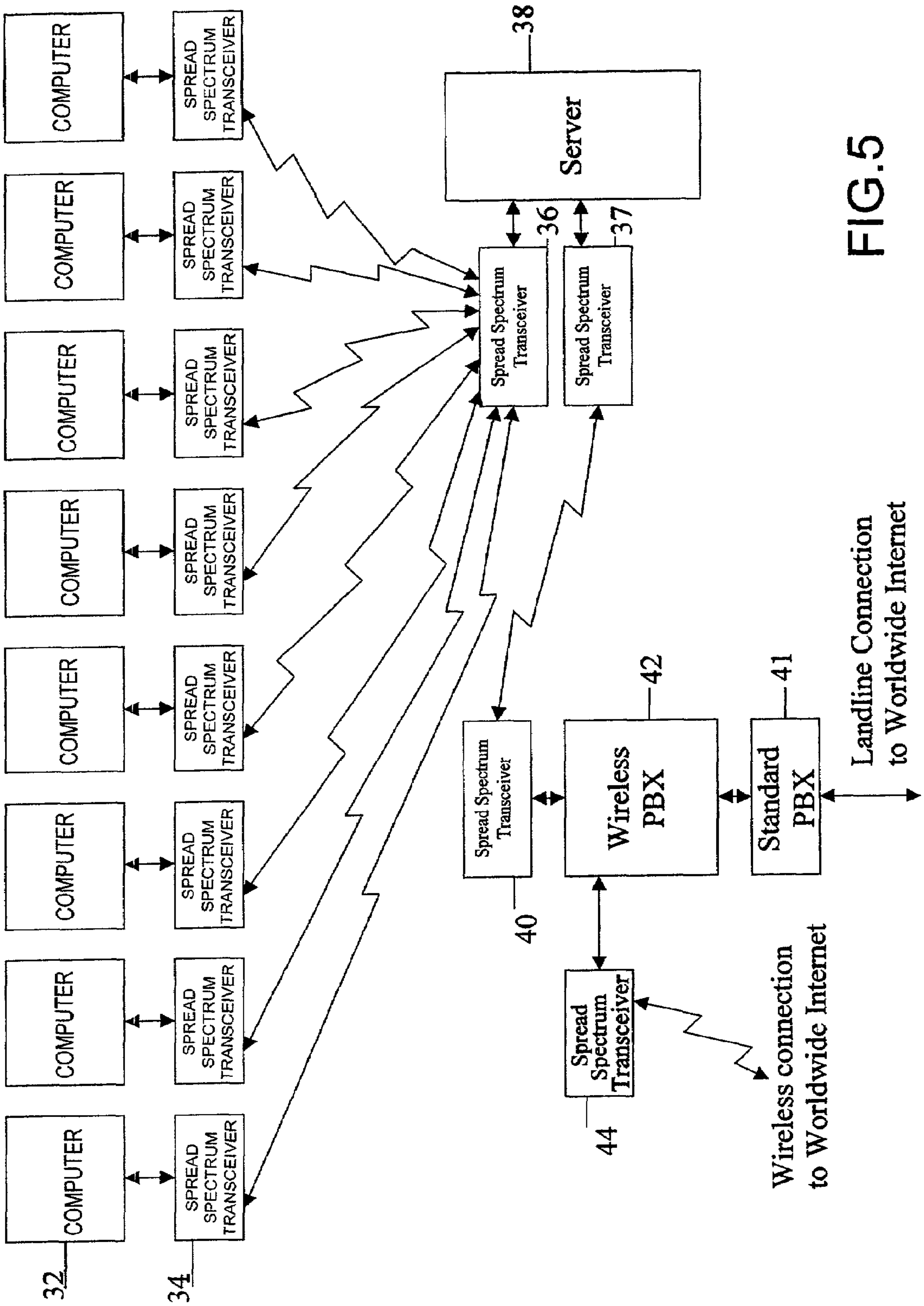
FIG. 5 is a high level block diagram of a multi-station system embodiment of the invention.

As shown in FIG. 5, a multiple number of stations having computers 32 (or other active electronic signaling devices) located anywhere in a large multi-story building or on a large floor having multiple transmission barriers are each coupled to an associated spread spectrum transceiver 34. These spread spectrum transceivers employ two-way wireless electromagnetic communication over paths that include corridors, stairwells 14 and through windows and zones 16 adjacent to the outer skin of the building to and from a spread spectrum transceiver 36 which is associated with a server 38. The computers 32 that are in communication with one another through the server 38 can be located virtually any place in the building because of their access to stairwells and windows that provide sufficient channels for the spread spectrum electromagnetic radiation.

FIG. 5 shows further communication that can be had through a second spread spectrum transceiver 37 associated with the server 38 to wireless PBX equipment 42 and a spread spectrum transceiver 40 coupled to the wireless PBX 42. The PBX 42 can be used to provide transmission over a standard land line PBX 41 or through a wireless spread spectrum transceiver 44.

Figure 6:
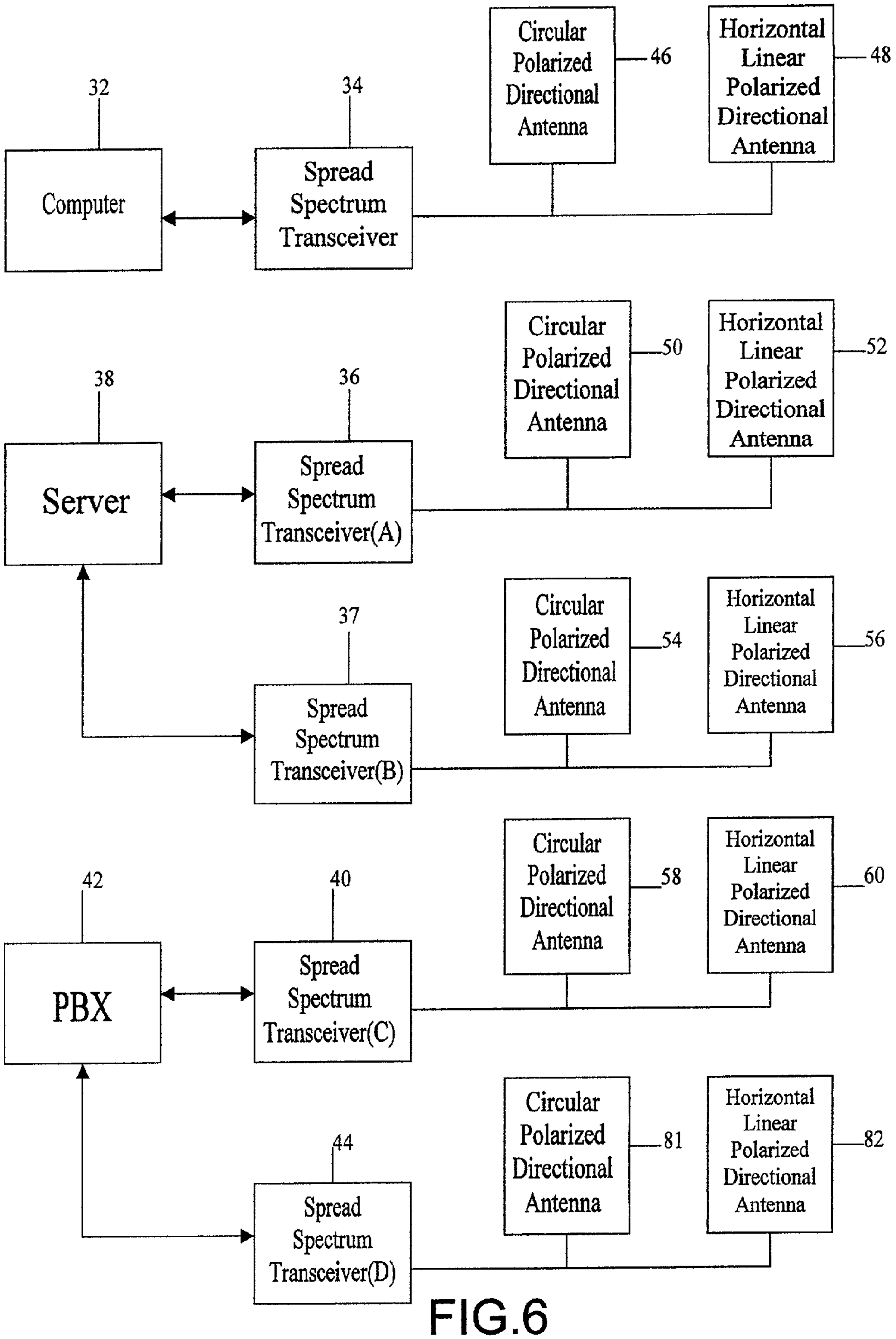
FIG. 6 is a block diagram illustrating one computer system, one server and a PBX component of the FIG. 5 system showing the antenna arrangement.

FIG. 6 shows certain additional details of the FIG. 5 system. Each station transceiver 34 associated with a computer 32 provides transmission to and from the computer 32 throughout two antennas. One of the antennas 46 is a circular polarized directional antenna. The other antenna 48 is a horizontal linear polarized directional antenna.

These antennas 46 and 48 are patch type antennas having an included angle of less than 60°. This antenna design provides enhanced concentration of radiated power along the transmission paths.

The circular polarization of the antennas 46 has been found to minimize the existence of null points. The antennas 48 are linear polarized with a horizontal electric field. The horizontal electric field enhances reflection from the floors of the building along which the electromagnetic energy is directed thereby minimizing energy loss. The signals from both type of antennas 46, 48 are coupled through the corridors, stairwells and windows and thus along the zones adjacent to the outside of the building so that communication can be had through the server 38 between computer stations almost anywhere in the building.

The spread spectrum transceiver 36 associated with the server 38 is appropriately synchronized to the spread spectrum transceivers 34 by known techniques.

In analogous fashion, communication between the server 38 and a wireless PBX 42 is through synchronized spread spectrum transceivers 37 and 40 respectively employing respective circular polarized directional antenna 54 and horizontal linear polarized directional antenna 56 for the transceiver 37 and circular polarized directional antenna 58 and horizontal linear polarized antenna 60 for the transceiver 40. Also wireless communication with the worldwide Internet is accomplished using transceiver 44 employing antennas 81 and 82.

Figure 7:
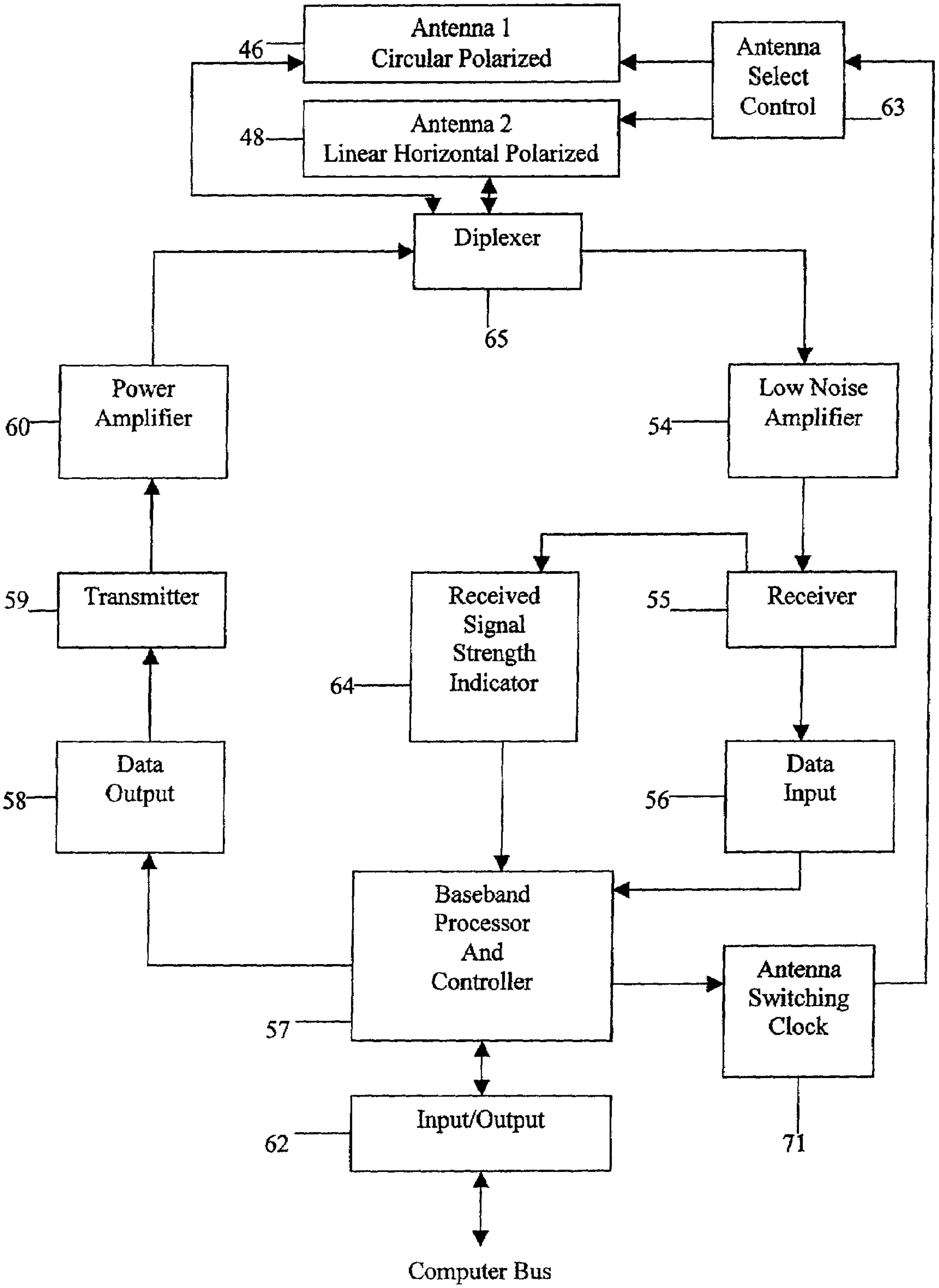
FIG. 7 is a block diagram showing the transceiver and switching equipment used at a given station to permit alternate transmission of circular polarized packets and linear polarized packets when in the transmitting mode and alternate reception of circular polarized packets and linear polarized packets when in the receiving mode.

FIG. 7 illustrates a computer network adapter used with each computer station 32. The antennas 46, 48 provide both transmission of broadcast information from the computer network adapter as well as receipt of broadcast information to the computer network adapter. The reception component of the adapter includes a low noise amplifier 54, a receiver 55 and a data input module 56 which transfers the demodulated signal to the baseband processor 57. The transmission component of the adapter includes a data output module 58 which transfers the data to be transmitted from the baseband processor 57, a transmitter 59 and a higher power output amplifier 60.

The baseband processor and controller 57 receives information from and transfers information to the computer 32 through an input/output module 62. The baseband processor and controller 57 gives instructions to the antenna select controller 63 which then switches the two directional polarized antennas 46, 48 to particular configurations in accordance with these instructions during transmission and reception. The received signal strength indicator 64 measures the relative signal strengths of the signals received by the two directional polarized antennas 46, 48 and enables only the largest signal to be processed. A diplexer 65 protects the receiving segment of the adapter from signals generated by the transmitting segment. An antenna switching clock 71, which is a component of the baseband processor and controller, determines when the appropriate timing sequence has been arrived at to enable reception or transmission. It also signals the antenna select control 63 to switch between antennas at each transmitted or received frequency before moving to the next transmitted or received frequency.

Figure 8:
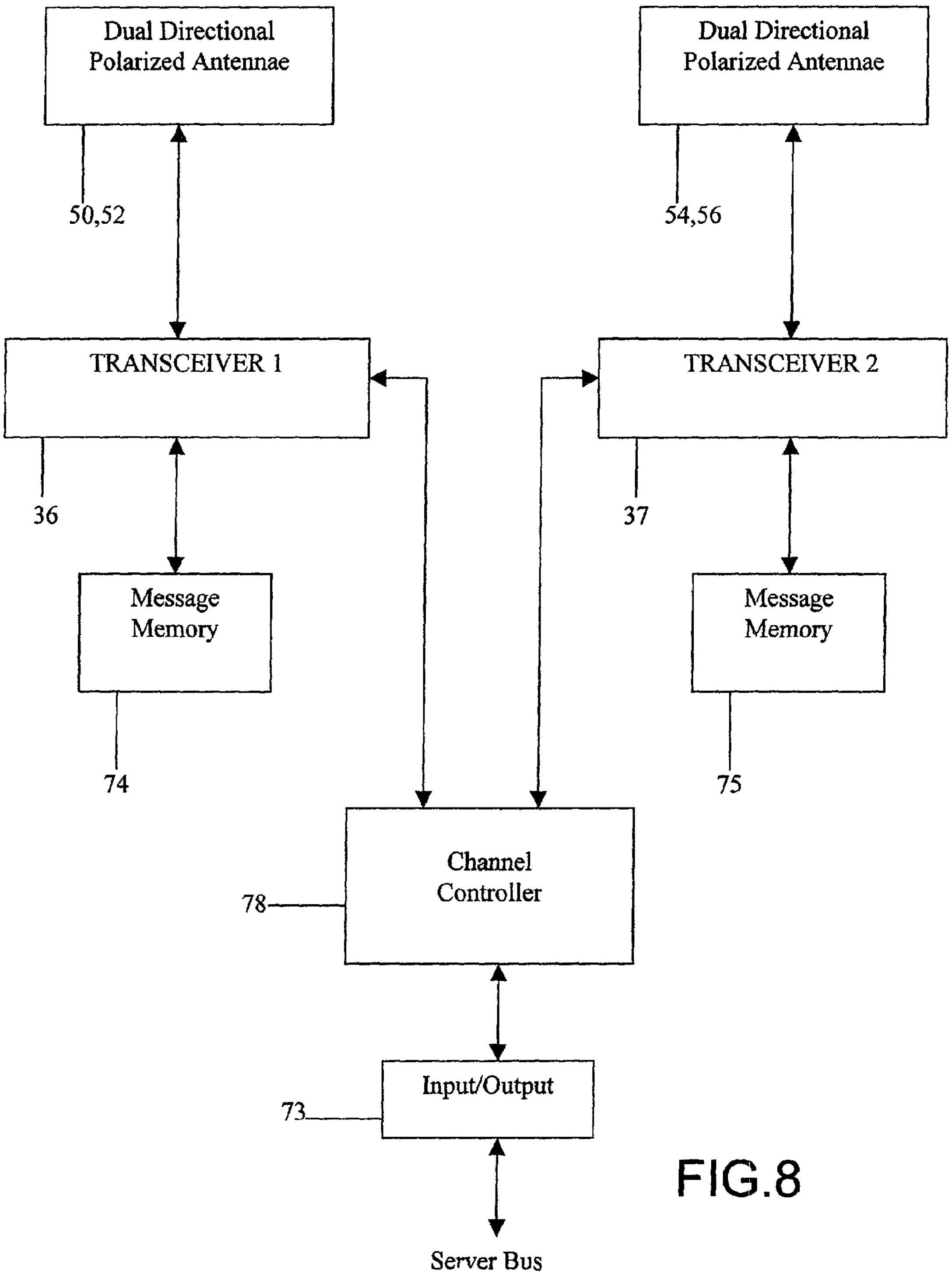
FIG. 8 is a block diagram showing equipment associated with a server.

FIG. 8 illustrates the network adapter employed with the server 38 in somewhat greater detail. The reception, transmission and processing of information is accomplished in a manner similar to that employed by the computer adapter including the directional polarized set of antennas 50, 52, a transceiver 36 including a baseband processor and controller and an input/output module 73. However, this unit also includes a message memory section 74 which stores requests while earlier requests are being processed. A second set of directional polarized antennas 54 and 56, transceiver 37, and message memory section 75 are used to communicate with the wireless PBX 42. They operate at different frequencies and with different modulation sequences. Therefore, the transceivers 36 and 37 can operate independent of each other.

The channel controller 78 determines which section will receive information from and transfer information to the server through the server network adapter input/output module 73 and thereby regulates the traffic within the server network adapter.

Figure 9:
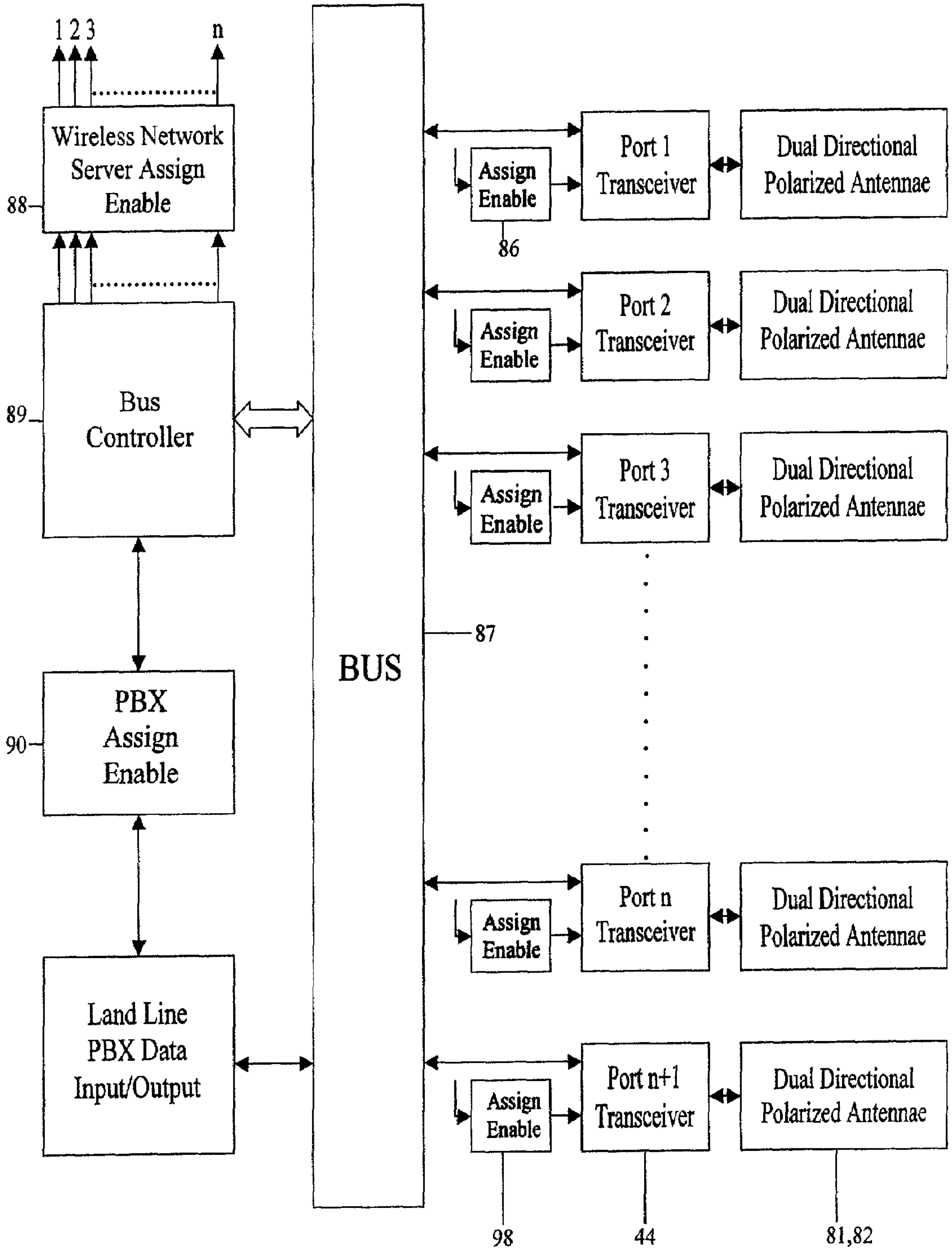
FIG. 9 is a block diagram showing equipment associated with the PBX.

FIG. 9 illustrates the wireless PBX 42 in somewhat greater detail. The antenna and transceiver configurations and method of transferring information to and from the bus 87 are similar to those employed by the computer network adapter (FIG. 5) and the server network adapter (FIG. 6). A bus controller 89 determines which transceiver points will be enabled and effects this through the wireless network server assign enable module 88. This module enables only the transceiver so designated to communicate with the bus 87. The bus controller 89 also determines which land line PBX 41 or section thereof will be connected to the wireless PBX 42 for transfer of information to and from server network adapters (FIG. 8). Coordination of server transceiver ports and land line PBX units is accomplished by the bus controller 89 when assigning the appropriate transceiver port enable 86 and PBX assign enable 90 simultaneously.

A separate transceiver 96 and antennas 81 and 82 tuned to the frequency employed by an Internet service provider is used to communicate with a wireless Internet service provider. An assign enable input 98 will be activated when this feature is employed.

What is claimed is:

1. A system for communication of electronic information between a plurality of electronic stations within a building comprising:

a plurality of spread spectrum transceivers, one of said transceivers being coupled to each station to provide spread spectrum signal transmission and reception for each station, said transmission between said stations being wireless, a plurality of directional antennas; wherein each of said transceivers is coupled to at least one of said antennas, each of said antennas having a directional parameter to assure transmission between said transceivers of said spread spectrum signals over convoluted paths, said convoluted paths being members of a group consisting of paths along communicating corridors at angles to one another on the floor of the building, and paths in and out of windows and paths along surfaces of the building.

2. The system of claim 1 wherein said spread spectrum signal is at least one of a frequency hopped modulated signal and a direct sequence modulated signal.

3. The system of claim 1 wherein at least some of said directional antennas are linear polarized having a substantial horizontal component.

4. The system of claim 2 wherein at least some of said directional antennas are linear polarized having a substantial horizontal component.

5. The system of claim 1 wherein at least some of said directional antennas are circular polarized.

6. The system of claim 2 wherein at least some of said directional antennas are circular polarized.

7. The system of claim 3 wherein at least some of said directional antennas are circular polarized.

8. The system of claim 4 wherein at least some of said directional antennas are circular polarized.

9. The system of claim 1 wherein said spread spectrum signal is a hybrid frequency hopped/direct sequence modulated signal.

10. The system of claim 3 wherein said spread spectrum signal is a hybrid frequency hopped/direct sequence modulated signal.

11. The system of claim 5 wherein said spread spectrum signal is a hybrid frequency hopped/direct sequence modulated signal.

12. The system of claim 7 wherein said spread spectrum signal is a hybrid frequency hopped/direct sequence modulated signal.

13. The system of claim 1 wherein said directional antenna include both those that are linear polarized having a substantial horizontal component and those that are circular polarized.

14. The system of claim 9 wherein said directional antenna include both those that are linear polarized having a substantial horizontal component and those that are circular polarized.

* * * * *